UNITED STATES PATENT OFFICE.

WALTER E. PICHT, OF SEATTLE, WASHINGTON.

PROCESS FOR PRESERVING BAIT.

1,358,985. Specification of Letters Patent. Patented Nov. 16, 1920.

No Drawing. Application filed April 8, 1920. Serial No. 372,265.

*To all whom it may concern:*

Be it known that I, WALTER E. PICHT, a citizen of the United States, and residing at Seattle, in the county of King and State of Washington, have invented certain new and useful Improvements in Processes for Preserving Bait, of which the following is a specification.

This invention relates to an improved process for the preservation of fish, and particularly fish designed for use as bait.

In preserving the fish for bait, it is desirable that the fish, usually cut into appropriate size, be so treated as to be substantially toughened, in order that they may be more readily retained on the hook, without interfering with the preservation thereof.

In carrying out the improved process the fish of a suitable character for bait, and either cut or whole, are placed in a solution of formaldehyde and water, substantially in the proportions of one teaspoonful of formalin to one half gallon of water. The fish are left in a solution until the solution becomes reddened by the blood extracted from the bodies of the fish. Ordinarily this will require about five days.

Following this, the partially treated fish are subjected to the action of a substantially similar solution, for substantially the same period of time, to further extract a large proportion of the remaining blood of the fish.

If desired, and as contemplated, the partially treated fish may be further subjected to a similar solution, for substantially the same period of time in order to as far as possible complete the extraction of blood from the fish.

Following this treatment the fish are subjected to a solution of formaldehyde, saltpeter, and salt, substantially in the proportions of one teaspoonful of formalin, one teaspoonful of saltpeter, and one quarter of a pound of salt. This solution with the fish is placed in an air tight container, preferably one which will not corrode, and fish will then keep for a substantially indefinite length of time without spoiling, being at the same time toughened to a degree to prevent the hook from pulling out of the bait under ordinary strain, without however so hardening the bait as to render it unsuitable for use.

The initial treating solutions, while preferably used in the exact proportions, and for the time periods referred to, may of course vary with different fish, and under such circumstances I contemplate the use of approximately similar solutions for the periods of time necessary to achieve the result stated.

I claim:

A process for preserving fish for bait consisting in subjecting the fish to a series of baths, each of a weak solution of formalin, subsequently subjecting the fish to a solution of formalin and salts.

In testimony whereof I affix my signature in the presence of two witnesses.

WALTER E. PICHT.

Witnesses:
SUZANNE MCLAUGHLIN,
J. D. GIVNAN.